Nov. 18, 1924.
S. GODDARD
TIRE CHAIN FOR VEHICLES
Filed May 21, 1924
1,515,811
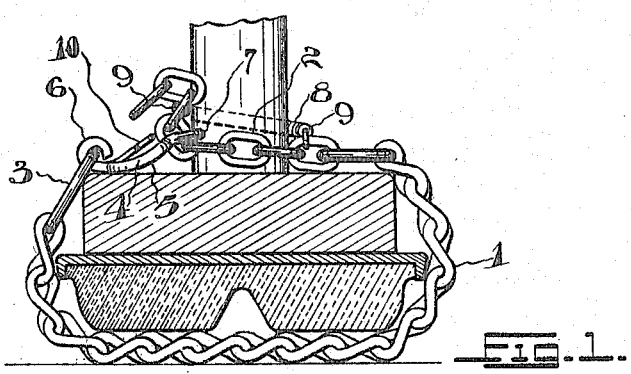
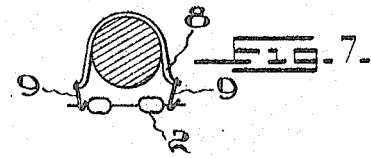
FIG.7.
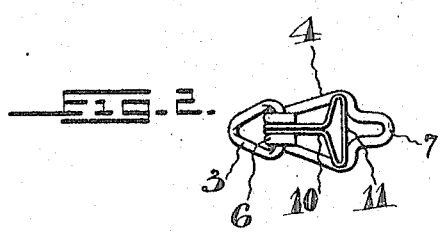
FIG.2.
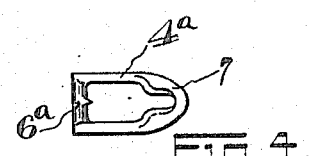
FIG.4.
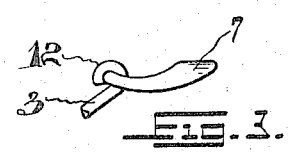
FIG.3.
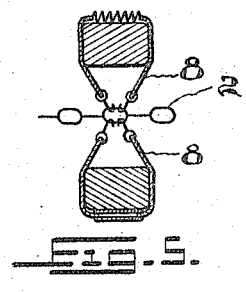
FIG.5.
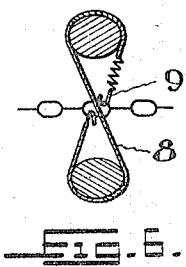
FIG.6.
INVENTOR.
S. Goddard.
BY J. Edward Maybee.
ATTY.

Patented Nov. 18, 1924.

1,515,811

UNITED STATES PATENT OFFICE.

STEWART GODDARD, OF TORONTO, ONTARIO, CANADA.

TIRE CHAIN FOR VEHICLES.

Application filed May 21, 1924. Serial No. 714,857.

*To all whom it may concern:*

Be it known that I, STEWART GODDARD, of the city of Toronto, in the county of York, Province of Ontario, Canada, a subject of the King of Great Britain, have invented certain new and useful Improvements in Tire Chains for Vehicles, of which the following is a specification.

This invention relates to anti-skid chains of the type commonly known as "grab chains," which are applied about the tire and felloe of the wheel at one or more different points as circumstances may require, and my object is to devise a chain which may easily be applied, which is less liable to damage the felloe than ordinary chains, and which is suitably restrained from motion transverse of the tire.

I attain my object by means of the constructions hereinafter described and illustrated in the accompanying drawings in which—

Fig. 1 is a cross section through a vehicle felloe and tire showing my improved chain in position;

Fig. 2 a plan view of the grab link and the straight link connected thereto;

Fig. 3 a side elevation of a modified form of grab link;

Fig. 4 a plan view of the same;

Figs. 5 and 6 diagrammatical views showing modified arrangements of the retainer, and Fig. 7 a diagrammatical view showing the preferred form of retainer.

In the drawings like numerals of reference indicate corresponding parts in the different figures.

1 is a tread chain of any ordinary pattern. To one end of this chain is secured a connecting chain 2 which is of the ordinary straight link type. To the other end of the tread chain is connected a straight link 3 adapted to lie against the side or edge of the felloe, as shown particularly in Fig. 1. To this straight link is connected a grab link 4, which is of the well known type shaped to form a key hole slot. This link is preferably formed of a piece of steel rod bent to shape as shown in Figs. 1 and 2. This link thus has widely separated bearing surfaces on the felloe, so that it has no tendency to tip sideways but always has these surfaces in contact with the felloe.

The under surface 5 of the link is rockered longitudinally, as shown in Fig. 1, and the ends of the rod are bent to form eyes 6 which are located above the under surface of the grab link. The chain engaging end 7 of the link is preferably bent back at an obtuse angle to the under surface 5 of the link, so that when the link of the chain 2 is engaged therewith, as shown in Fig. 1, the pull of the connecting chain is approximately parallel to the inner surface of the felloe. From this construction a minimum of damage is likely to be caused to the wooden felloe by the chain connections, particularly at the outer side of the wheel where damage shows. This is due particularly to the use of the straight link 3 engaging the grab link above its under surface while the under surface being rockered, a pull on the link 3 tends to rock the grab link and take up slack in the connecting chain rather than to slide it transversely of the felloe. With a drag on the tread, the link 3, the grab link 4 and the connecting chain tend to assume the position shown in Fig. 1. A tendency, however, still exists, which is common to chains of the same general type, to slide more or less transversely of the tire. This tendency I restrain by means of a retainer 8, which is preferably formed of spring material, such as rubber or a spring metal coil, and is provided at each end with a hook 9. These hooks engage with parts of the device at the inside of the felloe, the retainer itself lying on the opposite side of the spoke to the connecting chain. Preferably the retainer is hooked to a link of the connecting chain as closely as possible to the spoke, and the hook at the other end engaged with part of the free end of the chain outside of the link engaged by the grab link 4. This retainer being elastic, permits of all necessary movements of the device, while it constantly tends to retain the parts in proper position. It also serves the function of retaining the connecting chain in engagement with the grab link. I prefer, however, for this purpose to also provide a latch 10, which is pivoted on the end of the straight link 3 between the eyes 6, and is provided with a T-head 11 adapted to rest on the sides of the grab link behind the link of the chain 2 engaged thereby.

In Figs. 3 and 4 I show a modification in which the grab link 4ᵃ is formed of a malleable casting. A round cross bar 6ᵃ being substituted for the eyes 6. This necessitates the straight link being provided with eyes 12 which are bent round the bar 6ª. The under side of the link is rockered in the same manner as the under side of the link 4, and the chain engaging end 7 is similarly directed at an obtuse angle to the under surface of the link. In this construction, when a tread chain is to be replaced, the eyes 12 may be opened up and the grab link removed, which will usually necessitate the replacement of the straight link.

With the construction shown in Fig. 1, it will be necessary to open up the eyes 6, which will probably necessitate the replacement of the grab link.

If desired, however, split links may be employed to connect the tread chain to the rest of the device, and such an arrangement being common in the art is not shown.

In Fig. 6 I show a modified arrangement of the retainer 8, which is made long enough to pass round two adjacent spokes. A further modification is shown in Fig. 5, two retainers 8 being employed respectively passing round adjacent spokes. It will be understood, of course, that one end of a retainer may be permanently secured in position.

What I claim is:—

1. A tire chain comprising a tread member; a connecting chain secured to one end of the tread member; and a grab link connected to the other end of the tread member adapted for engagement with the connecting chain, said grab link having a longitudinally rockered under surface shaped to form a wide spread bearing adapted to engage the inner periphery of the felloe.

2. A tire chain comprising a tread member; a connecting chain secured to one end of the tread member; a straight link connected to the other end of the tread member and adapted to lie with both sides against the edge of a felloe; and a grab link pivotally connected to the said straight link and adapted for engagement with the connecting chain, said pivotal connection being located above the under surface of the grab link.

3. A tire chain comprising a tread member; a connecting chain secured to one end of the tread member; a straight link connected to the other end of the tread member; and a grab link pivotally connected to the said straight link and adapted for engagement with the connecting chain, said pivotal connection being located above the under surface of the grab link, the under surface of the link being longitudinally rockered and shaped to form a wide spread bearing for engagement with the inner periphery of the felloe.

4. A tire chain comprising a tread member; a connecting chain secured to one end of the tread member; and a keyhole slotted grab link connected to the other end of the tread member adapted for engagement with the connecting chain, said grab link having a longitudinally rockered under surface adapted to engage the inner periphery of the felloe and having its chain engaging end bent back at an obtuse angle to said under surface.

5. A tire chain comprising a tread member; a connecting chain secured to one end of the tread member; a key hole slotted grab link connected to the other end of the tread member adapted for engagement with the connecting chain, said grab link comprising a single piece of rod bent to key hole form and having the ends turned upwardly to form eyes for connection with the tread chain, said grab link having a longitudinally rockered under surface adapted to engage the inner periphery of the felloe and having its chain engaging end bent back at an obtuse angle to said under surface.

6. A tire chain comprising a tread member; a connecting chain secured to one end of the tread member; a grab link connected to the other end of the tread member adapted for engagement with the connecting chain; and an elastic retainer adapted to pass round a spoke and provided with means at each end for engagement with parts of the device at the inside of the felloe.

7. A tire chain comprising a tread member; a connecting chain secured to one end of the tread member; a straight link connected to the other end of the tread member and adapted to lie with both sides against the edge of a felloe; a grab link pivotally connected to the said straight link and adapted for engagement with the connecting chain; and a latch pivoted concentric with the grab link adapted to retain the connecting chain in engagement with the grab link the latter being shaped to have a wide spread bearing against the felloe.

Signed at Toronto, Canada, this 15th day of April, 1924.

STEWART GODDARD.